2,866,794
SELECTIVE HYDROGENATION

Helmuth Cords, Jamesburg, N. J., assignor to Olin Mathieson Chemical Corporation, New York, N. Y., a corporation of Virginia No Drawing. Application December 14, 1955
Serial No. 552,987

8 Claims. (Cl. 260—346.2)

This invention relates to an improved process for selectively hydrogenating chemical compounds, and more particularly to the selective hydrogenation of a 3,6-endoxy-3,6-dihydrophthalic acid ester to the corresponding 3,6-endoxy-3,4,5,6-tetrahydrophthalic acid ester.

The synthesis of pyridoxine from furan involves the utilization of the intermediate compound, the diester of furan-3,4-dicarboxylic acid (see U. S. patent application of Clauson-Kaas et al., Serial No. 471,896, filed November 29, 1954, now Patent No. 2,806,852). This intermediate can be prepared in accordance with the process of Alder and Rickert [Berichte der deutschen chemischen Gesellschaft, vol. 70, p. 1354 (1937)] by reacting furan with a diester of acetylene dicarboxylic acid (e. g. the diethyl ester) to form the Diels-Alder adduct, the diester (e. g. the diethyl ester) of 3,6-endoxy-3,6-dihydrophthalic acid, which is then partially hydrogenated to form the corresponding diester of 3,6-endoxy-3,4,5,6-tetrahydrophthalic acid; the latter is then pyrolyzed to the corresponding diester of 3,4-furandicarboxylic acid. Experience has shown that the partial hydrogenation is the critical step in this series, since care must be taken that only one mole of hydrogen is taken up per mole of adduct, thereby preventing the formation of the undesired totally-saturated derivative, the diester of 3,6-endoxy-hexahydrophthalic acid.

An object of this invention, therefore, is the provision of a process for selectively hydrogenating a diester of 3,6-endoxy-3,6-dihydrophthalic acid to produce the corresponding diester of 3,6-endoxy-3,4,5,6-tetrahydrophthalic acid to the exclusion of the totally-saturated hexahydrophthalic acid derivative.

Another object of this invention is the provision of a process for selectively hydrogenating a diester of 3,6-endoxy-3,6-dihydrophthalic acid in high yield and good purity.

These objects are achieved by the process of this invention, which essentially comprises hydrogenating a diester of 3,6-endoxy-3,6-dihydrophthalic acid by reacting the diester with hydrogen in the presence of a hydrogenation catalyst and a solvent comprising a liquid halogenated hydrocarbon. The resultant diester of 3,6-endoxy-3,4,5,6-tetrahydrophthalic acid can either be recovered, or be converted in situ by pyrolysis to the corresponding diester of furan 3,4-dicarboxylate. I have found that by conducting the hydrogenation reaction in a solvent which comprises a liquid halogenated hydrocarbon (preferably a chlorinated hydrocarbon), the reaction ceases (or the rate of reaction substantially decreases) after the uptake of one mole of hydrogen per mole of ester to yield the desired partially hydrogenated 3,4,5,6-tetrahydrophthalate in lieu of and to the substantial exclusion of the undesired perhydrogenated product.

Among the halogenated hydrocarbon solvents utilizable in the process of this invention may be mentioned the chlorinated lower alkanes (e. g. carbon tetrachloride, chloroform, methylene chloride and trichloroethylene), the chlorinated lower cycloalkanes (e. g. chlorocyclohexane), the chlorinated aromatic hydrocarbons, and particularly those of monocyclic aromatic hydrocarbons (e. g. chlorobenzene, 1,2-and 1,3-dichlorobenzene). These compounds may be used either singly or in combination with other halogenated hydrocarbon or with non-halogenated solvents, such as polar solvents as exemplified by butanol and acetone or non-polar solvents as exemplified by benzene. The amount of total solvent present is sufficient to completely dissolve the 3,6-endoxy-3,6-dihydrophthalic acid ester reactant, although of course any excess thereover can be used.

The hydrogenation can be conducted in all other respects in a manner well known in the art. Thus, among the suitable hydrogenation catalysts are: palladium, preferably on a suitable carrier such as palladium on alumina or palladium on carbon; platinum, preferably either on a suitable carrier, such as platinum on alumina or platinum on carbon, or as its oxide; ruthenium, again preferably on a carrier such as ruthenium on alumina; and sponge nickel when trichloroethylene or chlorobenzene is used as the solvent.

In order to obtain maximum yields of the desired partially-hydrogenated product, at least one mole of hydrogen is used per mole of dihydrophthalate. Any excess thereover is operative, however, since the halogenated hydrocarbon solvents of this invention have the unique property of inhibiting the further hydrogenation of the desired tetrahydrophthalate product to form the undesired hexahydro (or perhydro)-phthalate.

Although any diester of 3,6-endoxy-3,6-dihydrophthalic acid can be used, the preferred esters are those of lower alkanols (e. g. the dimethyl, the diethyl, the dipropyl and the dibutyl esters).

The hydrogenation reaction can be conducted at any normal pressure and temperature including superatmospheric pressure and temperature; but for convenience, it is preferably carried out at ambient pressure and temperature.

The following examples illustate the invention:

Example 1

29.4 g. of dibutyl 3,6-endoxy - 3,6-dihydrophthalate [prepared from dibutyl acetylene dicarboxylate and furan according to the procedure of Diels and Alder, Ann., 490, 243 (1931)] is hydrogenated under atmospheric pressure in 100 ml. of carbon tetrachloride in the presence of 1 g. of 5% palladium on alumina. After 225 ml. of hydrogen is consumed the uptake stops sharply. The catalyst is filtered off, the dibutyl 3,6-endoxy-3,4,5,6-tetrahydrophthalate is pyrolyzed at 180° C. and the resulting dibutyl furan-3,4-dicarboxylate distilled in vacuo (122–125° C./0.1 mm. mercury). Yield about 21.0 g. (78.2%).

Example 2

21.02 g. of dimethyl 3,6-endoxy-3,6-dihydrophthalate [prepared from dimethyl acetylene dicarboxylate and furan according to the procedure of Diels and Alder, supra] in 100 ml. of trichloroethylene is hydrogenated at 50 pounds per square inch pressure in the presence of 2 g. of 5% rhodium on alumina. After 20 to 30 minutes the hydrogen uptake stops sharply. The catalyst is filtered off and the mixture treated as in Example 1 to yield about 14.9 g. (81%) of dimethyl furan-3,4-dicarboxylate, B. P. about 91–93° C. at 1.2 mm. mercury.

Example 3

23.0 g. of dibutyl 3,6-endoxy-3,6-dihydrophthalate in 200 ml. of chlorobenzene is hydrogenated under atmospheric pressure in the presence of 2.0 g. of 5% palladium on alumina. After the uptake of 1,760 ml. of hydrogen in about fifteen minutes, no further hydrogen is consumed. Further treatment in accordance with the procedure of Example 1 yields dibutyl furan-3,4-dicarboxylate.

Example 4

The procedure of Example 3 is repeated with 200 ml. of chloroform substituted for the chlorobenzene. After the uptake of 1,800 ml. of hydrogen in about one-half hour, there is a distinct leveling off, so that after one hour less than 200 ml. of hydrogen has been consumed.

Example 5

9.1 g. of dibutyl 3,6-endoxy-3,6-dihydrophthalate in 100 ml. of trichloroethylene is hydrogenated under atmospheric pressure in the presence of 1.0 g. of a sponge nickel catalyst. After the uptake of 700 ml. of hydrogen in one-half hour, there is no further consumption of hydrogen. Further treatment in accordance with the procedure of Example 1 yields dibutyl furan-3,4-dicarboxylate.

Example 6

9.1 g. of dibutyl 3,6-endoxy-3,6-dihydrophthalate in 100 ml. of chlorobenzene is hydrogenated under atmospheric pressure in the presence of 800 mg. of a sponge nickel catalyst. After the uptake of 800 ml. of hydrogen in three-quarters of an hour, there is no further consumption of hydrogen. Further treatment in accordance with the procedure of Example 1 yields dibutyl furan-3,4-dicarboxylate.

Example 7

17.8 g. of dibutyl 3,6-endoxy-3,6-dihydrophthalate in 150 ml. of carbon tetrachloride is hydrogenated under atmospheric pressure in the presence of 500 mg. of platinum dioxide. After the uptake of 1,380 ml. of hydrogen in one-half hour, there is no further consumption of hydrogen. Further treatment in accordance with the procedure of Example 1 yields dibutyl furan-3,4-dicarboxylate.

Example 8

17.8 g. of dibutyl 3,6-endoxy-3,6-dihydrophthalate in 150 ml. of chlorobenzene is hydrogenated under atmospheric pressure in the presence of 2.0 g. of 3% platinum on alumina. After the uptake of 1,600 ml. of hydrogen is about 45 minutes there is a leveling off so that after 80 minutes 168 ml. of hydrogen has been consumed.

Example 9

26.0 g. of dimethyl 3,6-endoxy-3,6-dihydrophthalate in 200 ml. of carbon tetrachloride is hydrogenated at 50 pounds per square inch pressure in the presence of 200 ml. of 5% palladium on alumina. After the uptake of 2,800 ml. of hydrogen in about 35 minutes there is no further consumption of hydrogen. Further treatment in accordance with the procedure of Example 1 yields dimethyl furan-3,4-dicarboxylate.

By way of contrast, I have found that if acetone is substituted for the halogenated hydrocarbon solvents in the above examples and certain of the catalysts are chosen (specifically tried were 3% palladium on alumina, 5% palladium on alumina, 5% rhodium on alumina, and platinum dioxide) invariably two moles of hydrogen were taken up (at atmospheric pressure) when attempts were made to selectively hydrogenate either the dimethyl or the dibutyl ester of 3,6-endoxy-3,6-dihydrophthalic acid. These same results were observed when other solvents (specifically methanol, 10% aqueous methanol, 2N methanolic hydrochloric acid, ethanol, acetone, ethyl acetate, acetic acid, benzene and hexane) were substituted for the halogenated hydrocarbons, or when the reaction was conducted in the absence of any solvent. It is seen, therefore, that the liquid halogenated hydrocarbons used as solvents in the process of this invention have the unique property, not shared by other commonly used polar and nonpolar organic solvents, of inhibiting the addition of a second mole of hydrogen in the selective hydrogenation of a 3,6-endoxy-3,6-dihydrophthalate to the desired partially-hydrogenated 3,6-endoxy-3,4,5,6-tetrahydrophthalate.

The invention may be variously otherwise embodied within the scope of the appended claims.

I claim:

1. The process of claim 8 wherein at least one mole of hydrogen is used per mole of dihydrophthalic acid ester.
2. The process of claim 1 wherein the diester of 3,6-endoxy-3,6-dihydrophthalic acid is the di(lower alkyl) ester.
3. The process of claim 2 wherein the liquid solvent is a chlorinated lower alkane.
4. The process of claim 2 wherein the liquid solvent is a chlorinated monocyclic aromatic hydrocarbon.
5. The process of claim 2 wherein the catalyst comprises palladium.
6. The process of claim 2 wherein the catalyst comprises platinum.
7. The process of claim 2 wherein the catalyst comprises rhodium.
8. A process for selectively hydrogenating a 3,6-endoxy-3,6-dihydrophthalate, which comprises reacting a diester of 3,6-endoxy-3,6-dihydrophthalic acid with hydrogen in the presence of a hydrogenation catalyst comprising an element selected from the group consisting of palladium, platinum and rhodium in a liquid solvent of the group consisting of chlorinated lower alkanes, chlorinated cycloalkanes, and chlorinated aromatic hydrocarbons, and recovering the 3,6 - endoxy - 3,4,5,6 - tetrahydrophthalate formed.

References Cited in the file of this patent

Norton: Chem. Reviews, vol. 31, pp. 468–473 (1942).
Diels: Annalen, 490: 251 (1931).
Alder: Annalen, 535: 111 (1938).
Stork et al.: J. A. C. S., 75: 384–392 (1932).